United States Patent [19]

Munakata

[11] Patent Number: 5,717,917
[45] Date of Patent: Feb. 10, 1998

[54] METHOD OF CONTROLLING INFORMATION ON DATA LINKS AND APPARATUS FOR CONTROLLING INFORMATION ON DATA LINKS

[75] Inventor: Koichi Munakata, Hyogo, Japan

[73] Assignee: Mitsubishi Denki Kabushiki Kaisha, Tokyo, Japan

[21] Appl. No.: 384,957

[22] Filed: Feb. 7, 1995

[30] Foreign Application Priority Data

Mar. 4, 1994 [JP] Japan ............... 6-034865

[51] Int. Cl.$^6$ .................................. C06F 17/30
[52] U.S. Cl. ............... 395/608; 395/609; 395/200.01; 395/356; 395/329; 370/431
[58] Field of Search ................... 395/600, 156, 395/200, 153, 608, 609, 200.01, 356, 329; 369/50; 370/431

[56] References Cited

U.S. PATENT DOCUMENTS

| | | | |
|---|---|---|---|
| 5,297,249 | 3/1994 | Bernstein et al. | 395/156 |
| 5,343,469 | 8/1994 | Ohsima | 370/85.1 |
| 5,388,196 | 2/1995 | Pijak et al. | 395/153 |
| 5,446,842 | 8/1995 | Schaeffer et al. | 395/200 |
| 5,563,860 | 10/1996 | Kubo et al. | 369/50 |

FOREIGN PATENT DOCUMENTS 2-222990   9/1990   Japan .

OTHER PUBLICATIONS

J. Noll & W. Scacchi, "Integrating Diverse Information Repositories: A Distributed Hypertext Approach", Computer Dec. '91.

*Primary Examiner*—Thomas G. Black
*Assistant Examiner*—Cheryl R. Lewis
*Attorney, Agent, or Firm*—Wolf, Greenfield & Sacks, P.C.

[57] ABSTRACT

A method of controlling information on data links is provided which allows a user to establish a new link between a data which is being referred to by some other user or task and another data and to update and delete pieces of link information which has been established for the former data. A data layer composed of a plurality of data and a link layer for holding link information which represents link relationships among the plurality of data are disposed separately. In the case that a user refers to a data in the data layer except when link information in the link layer is being referred to or updated, other users are inhibited from modifying the data and are allowed to read the data. Furthermore, other users are allowed to read and modify the link information in the link layer which corresponds to the data being referred to.

19 Claims, 11 Drawing Sheets

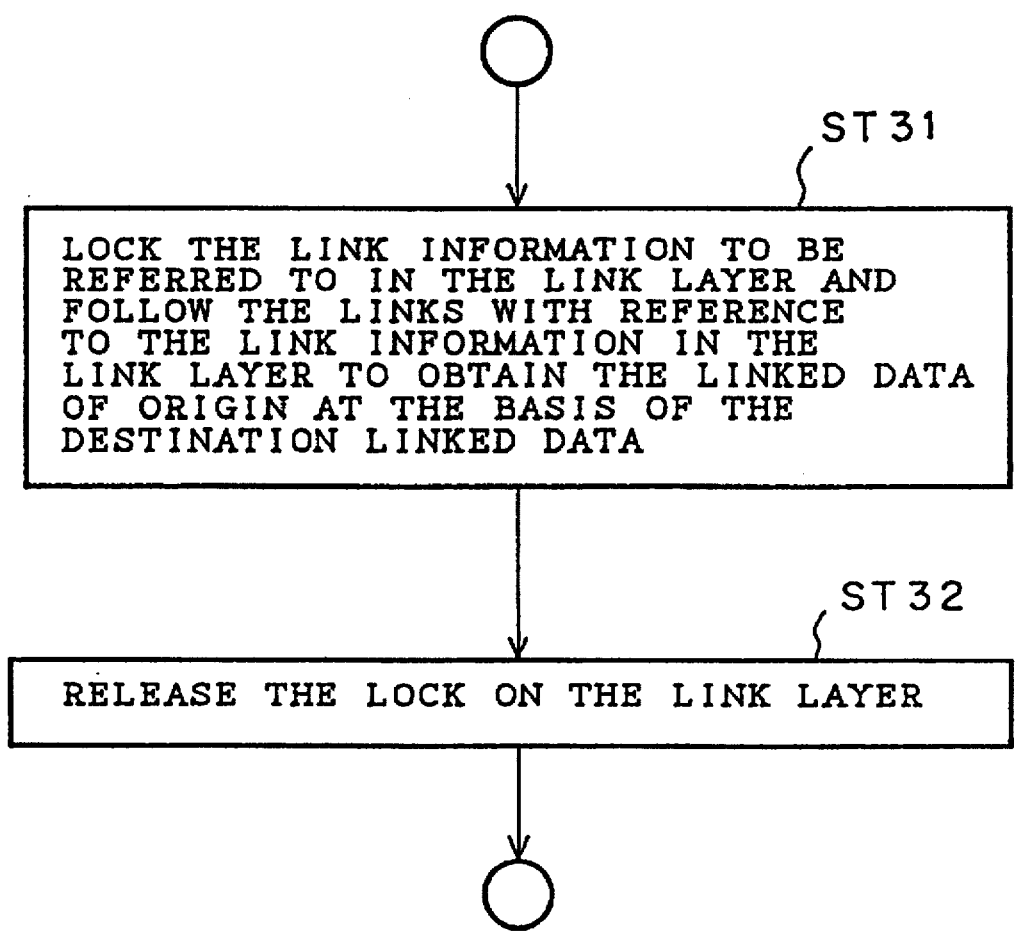

METHOD OF CONTROLLING INFORMATION ON DATA LINKS AND APPARATUS FOR CONTROLLING INFORMATION ON DATA LINKS

BACKGROUND OF THE INVENTION

1. Field of the Invention

The present invention relates to a method of controlling information on data links and more particularly to an apparatus for controlling link information about media data in a hypermedia system or the like.

2. Description of the Prior Art

Referring now to FIG. 1, it illustrates a block diagram of a multimedia supervising apparatus, which is a kind of conventional data retrieving apparatus, disclosed in Japanese Laid Open No. 2-222 990, for example. In the figure, shown are a document information storage device 1 in which documents are stored as media, multimedia information controlling device 2 for controlling input/output of information from and to various kinds of information media, a keyboard 3 which functions as an input device through which a request signal is input by a user, and a mouse 4. Furthermore, a reference numeral 5 denotes a central processing unit (or CPU for short) which performs a retrieving operation in response to a request signal input by a user and outputs a signal to the multimedia information controlling device 2 in order to obtain a target data; and 6, a display device which provides contents retrieved and output by the CPU 5.

The document information storage device 1, multimedia information controlling device 2, keyboard 3, mouse 4, CPU 5 and display device 6 are included in a hypermedia system 7. The hypermedia system 7 serves to connect documents stored in the document information storage device 1 by means of nonlinear retrieving paths which depend on mutual relationships between documents such as a context in the same document, a hierarchical relationship between documents with respect to contents, and a relationship between a document and another document which is directly referred to by the former document.

Furthermore, in the figure shown are an image and sound information storage device 8 connected to the multimedia information controlling device 2 in the hypermedia system 7 for storing image and sound information associated with each document stored in the document information storage device 1, a provider of information or a source of information 10 (it is refereed to as an outside source of information hereinafter) that provides the multimedia information controlling device 2 with information from outside of the device 2, and an access bus 11 such as a telephone line or an optical fiber for connecting the outside source of information 10 with the multimedia information controlling device 2.

In operation, when a user who desires to retrieve a document inputs a request signal by using the keyboard 3 or the mouse 4 in the multimedia supervising apparatus having the aforementioned structure, the corresponding electronic document is retrieved and displayed on the display device 6. Furthermore, the display device 6 can display image and sound information stored in the image and sound information storage device 8 through the multimedia information controlling device 2 and information provided by the outside source of information 10 like the provider outside. In addition, contents retrieved by a user can be printed or sounded by the output device 9 on demand.

Referring now to FIG. 2, an example of a display screen of a general data displayed on the display device 6 is shown.

In the figure, shown are a document display area 12 in which a document is displayed, buttons 13 and 14 disposed respectively on key words in documents a and b which are directly quoted from the document which is being referred to, and buttons 15 to 19 which are arranged in a row on the left side of the screen. The button 15 is a button for causing the system to retrieve an associated document. The button 16 is a button for causing the system to open a sound file included in a document. The button 17 is a button for causing the system to print a document. The button 18 is a button for causing the system to display an image file included in a document. The button 19 is a button for causing the system to access pieces of information in the outside source of information.

If a user clicks the mouse 4 as an input device while the button 13 or 14 corresponding to a document a or b is indicated on the screen, the content of the document a or b, which is directly quoted from the document displayed in the document display area 12 on the display screen of the display device 6, can be retrieved. If a user clicks the mouse 4 while the button 15 for retrieving an associated document is indicated on the screen, the content of the previous or next page in the displayed document, the content of a document located in the previous or next layer of that of the displayed document or the content of a document of origin which quotes the displayed document can be retrieved. If a user clicks the mouse 4 while the sound button 16 is indicated on the screen, the content of the document displayed in the document display area 12 can be converted into a human voice. If a user clicks the mouse 4 while the print button 17 is indicated on the screen, the content of the document displayed in the document display area 12 can be printed out by the output device 9. If a user clicks the mouse 4 while the image information display button 18 is indicated on the screen, an image associated with the document displayed can be displayed. When a user needs to access the outside source of information 10 while retrieving a document, the user can access the outside source by clicking the mouse 4 while the button 10 for accessing the outside source of information is indicated.

FIG. 3 shows an example of a media data such as a document, an image or a sound displayed on the display device 6. In the figure, shown are a cursor 61 which indicates the active position of coordinates on the screen at which the mouse 4 points, a media data 41 displayed on the display device 6, and key data 411a, 412a and 413a included in the media data 41.

FIG. 4 illustrates an example of the data structure in which media data such as documents, images or sounds are linked to each other. In the figure, shown are media data 41 to 46 such as documents. The key data 411a is associated with a word in the content of the media data 41 and a specified position of an image data in the media data 41 and is connected with the media data 42 associated with the key data 411a by way of a bi-directional link. Thus, the media data 42 can be obtained with reference to the piece of link information which the key data 411a holds and, in contrast with this, the key data 411a can be obtained with reference to the piece of link information which the media data 42 holds.

The key data 412a which belongs to the media data 41 is connected with the media data 43 by way of a bi-directional link. Furthermore, the key data 421a and 422a which belong to the media data 42 are connected with the media data 45 and 46 by way of bi-directional links, respectively. The key data 431a which belongs to the media data 43 is connected with the media data 46 by way of a bi-directional link.

An arrow extended from the key data 411a to the media data 42 indicates that a link is established from the media data 41 to the media data 42 and clicking a mouse while the key data 411a is indicated causes the system to display the media data 42. It is the same with an arrow extended from the key data 412a to the media data 43, an arrow extended from the key data 413a to the media data 44, an arrow extended from the key data 421a to the media data 45, an arrow extended from the key data 422a to the media data 46, and an arrow extended from the key data 431a to the media data 46.

Referring now to FIG. 5, it shows an example of a piece of link information about the media data 42. As shown in the figure, the piece of link information which the media data 42 holds consists of an identification data (or ID for short) for specifying the linked data of origin 421a, from which the corresponding link is extended to the media data 42, and pieces of information on the destination linked data 421a and 422a, to which the corresponding links are extended from the linked data of origin. The pieces of information of the destination linked data 412a and 422a consist of x and y coordinates of the key data 421a and 422a and the IDs of the destination linked data 45 and 46, respectively.

Next, the description will be directed to an operation of deleting the media data 42.

First, the bi-directional link established between the key data 411a and the media data 42 is disconnected. That is, the linked data of origin 411a is obtained with reference to the ID of the data of origin from which the corresponding link is extended to the media data 42 and then the piece of link information which the key data 411a holds is changed so that the destination linked data, to which the corresponding link is extended from the key data 411a, is set to be a NULL. In addition, the piece of link information which the key data 42 holds is changed so that the linked data of origin, from which the corresponding link is extended to the media data 42, is set to be a NULL. If the destination linked data or linked data of origin is a NULL, the corresponding key data is not linked to any media data.

Next, the bi-directional link which connects the key data 421a with the media data 45 and bi-directional link which connects the key data 422a with the media data 46 are disconnected. Furthermore, the media data 42 and key data 421a and 422a are deleted. In order to update the piece of link information on the key data 411a from which the corresponding link is extended when the media data 42 is deleted, the link established between the key data and the media data is constituted by such a bi-directional link which can be followed not only in the direction toward a destination linked data to which the corresponding link is extended, but in the reverse direction toward a linked data of origin from which the corresponding link is extended.

Since data and link information in the conventional data retrieving apparatus are so structured as mentioned above, a concurrency control must be performed in a decentralized environment, wherein a plurality of users or tasks utilize the data and link information, in order to allow the plurality of users and tasks to access the data retrieving apparatus simultaneously and to maintain the consistency of the data structure. To this end, a locking method has been used typically.

To give a simple explanation of the method, the description will be directed to an operation of the data retrieving apparatus in the case that a plurality of users simultaneously access the apparatus. In general, there are two types of lock, i.e. read lock and write lock. When a user refers to a data, the user tries to obtain a read lock on the data first of all. If the user obtains the read lock, the user is allowed to refer to the data. The read lock on the data is held while the user is referring to the data. Then, when the user finishes referring to the data, the read lock on the data is freed.

On the other hand, when a user updates a data, the user tries to obtain a write lock on the data first of all. If the user obtains the lock, the user is allowed to update the data. The write lock on the data is held until the user finishes updating the data. Then, when the user finishes updating the data, the write lock on the data is freed.

While a user holds a read lock on a data, another user is allowed to obtain a read lock on the same data, but is not allowed to obtain a write lock on the same data. While a user holds a write lock on a data, no other user is allowed to obtain either a read lock or a write lock on the same data.

That is, while a user holds a read lock on a data, other users are inhibited from modifying the data, but are allowed to read the data. While a user holds a write lock on a data, other users are inhibited from modifying the data and reading the data.

When a user A is referring to the media data 41, key data 411a, 412a and 413a, media data 42, and key data 421a and 422a in FIG. 4, the user A holds a read lock on the media data 41 and 42 and key data 411a, 412a, 413a, 421a and 422a. Simultaneously, if another user B is referring to the media data and key data 421a and 422a, the user B holds a read lock on the media data 42 and key data 421a and 422a.

In this case, the user A cannot disconnect the bi-directional link between the key data 411a and the media data 42 even if the user A desires to disconnect the link: the reason is that the ID of the linked data of origin in the piece of link information about the media data 42 must be updated to be a NULL in order to disconnect the bi-directional link, but the ID cannot be updated because the media data 42 is read locked by the user B.

When the other user B is referring to the media data 46 in FIG. 4 while the user A is referring to the media data 44 and 46, the media data 44 is read locked by the user A and the media data 46 is read locked by the users A and B.

In this case, the user A cannot establish a link from the key data 441a to the media data 46 even if the user desires to create the key data 441a and link the key data 441a with the media data 46: the reason is that the ID of the linked data of origin in the piece of link information about the media data 46 must be updated to be the key data 441a in order to establish the bi-directional link but the ID cannot be updated because the media data 46 is read locked by the user B.

Thus, a disadvantage of the prior art data retrieving apparatus is that if a link is established from a media data to another media data via a key data, the link cannot be updated while some other user is referring to the destination media data to which the corresponding link is extended. Furthermore, when some other user is merely referring to a data without updating the data, a new link cannot be established between the data and another data.

It is to be understood that the aforementioned data is not limited to media data in a hypermedia system: that is, another system with another type of data, e.g. numeral data, character data, a series of bits, or the like suffers from the same disadvantage.

As previously mentioned, in the prior art method of controlling information on data links, when some other user is referring to a data a user cannot create, update, or delete pieces of link information even if the user only refers to the data, because both the data and link information are write inhibited.

SUMMARY OF THE INVENTION

It is therefore an object of the present invention to provide a method of controlling information on data links and an apparatus for controlling information on data links in which a user can establish a new link for a data even if the data is being referred to by some other user, and then create, update, or delete pieces of link information associated with the data, whereby the foregoing disadvantages may be overcome.

According to the present invention, the method of controlling information on data links comprises the steps of disposing a data layer composed of a plurality of data; disposing a link layer which holds link information about link relationships among the plurality of data; and if a user refers to a data in the data layer except when the link information in the link layer is being referred to or updated, inhibiting other users from modifying the data and allowing the other users to read the data, and allowing the other users to read and modify the link information in the link layer which corresponds to the data being referred to.

When a user creates, updates, or deletes pieces of link information, some data in the data layer and the link information in the link layer, which are separated from each other, can be read or write locked independently. For example, when a user refers to a data in the data layer, the data is set to be in a read locked state, in which other users are allowed to read the contents of the data but are prevented from modifying the data by locking the data. On the other hand, the link information in the link layer is not locked and therefore everyone can read and change the link information freely.

In a preferred embodiment, when a user updates link information, other users are inhibited from reading and modifying a linked data of origin, from which the corresponding link is extended, by locking the linked data of origin in the data layer, and the other users are further inhibited from reading and modifying the link information by locking the link information in the link layer. After that, the lock on the link information and write inhibition on the linked data of origin are freed. Furthermore, when referring to link information to obtain a destination linked data, to which the corresponding link is extended, at the basis of the corresponding linked data of origin from which the corresponding link is extended, other users are allowed to read the referred link information and are inhibited from modifying the link information by locking the link information in the link layer. Then, the lock on the link information is released after the destination linked data is obtained. Instead of referring to or updating link information while following the link information in the normal direction of retrieving the link information from a linked data of origin to a destination linked data, to which the corresponding link is extended from the linked data of origin, referring or updating operations followed by retrieving link information in the reverse direction of links can be performed.

Thus, according to the present invention the data layer composed of a plurality of data and link layer for holding link information which represents link relationships among the plurality of data are disposed separately, and therefore data in the data layer and link information in the link layer can be read locked and write locked independently. Furthermore, if a user desires to create, update, or delete the piece of link information which corresponds to a data being referred to by some other user when the information on data links is not being referred to, or when the information on data links is not being updated, the data being referred to in the data layer is read locked while the link information in the link layer is not locked. Therefore, since the link information in the link layer which corresponds to the data being referred to cannot be locked, a new link can be established for the data which is being referred to and the link information can be changed or deleted. In addition, since other users cannot obtain a write lock on the data which is being referred to, the data is prevented from being altered by other users.

When link information is updated by a user, the link information in the link layer is locked only if the link information is changed actually, and then the information on data links is updated while other users are inhibited from reading and updating the information on data links. After that, the lock on the link information is released. Therefore, there are many chances that other users can read and update link information.

Preferably, one data can include a key data associated with the data. Furthermore, the data layer and link layer are structured in such a manner that one data can be linked with another data byway of a key data which belongs to the former data. Thus, link information can be updated by using the key data and can be referred to through the key data.

In a preferred embodiment, the link layer is constituted by a plurality of nodes each corresponds to each data in the data layer, and nodes, which have a link relationship between the nodes in the link layer, are connected to each other by a bi-directional link.

Preferably, at least a linked data of origin includes a key data associated with the data, and the corresponding linked node of origin holds position information about at least a key data which belongs to the data which corresponds to the linked node of origin and at least a pointer which indicates a destination linked node. Nodes, which have a link relationship between the nodes in the link layer, are connected to each other by a bi-directional link by way of a key data which belongs to the data which corresponds to the linked node of origin.

Alternatively, the link layer may include a node which corresponds to a key data, and nodes, which have a link relationship between the nodes in the link layer, are connected to each other by a bi-directional link by way of the node of a key data which belongs to the data which corresponds to the linked node of origin.

When one data is linked with a plurality of data by way of one key data which belongs to the former data, the node of the former data may be connected with the nodes of the plural data by bi-directional links by way of the node of the key data. In addition, a link between two key data which belong to different data can be established by a bi-directional link between the nodes which correspond to the two key data.

In a preferred embodiment, information on data in the data layer and information on data links in the link layer can be stored in a database in which concurrency control can be performed for a plurality of users.

Furthermore objects and advantages of the present invention will be apparent from the following description of the preferred embodiments of the invention as illustrated in the accompanying drawings.

BRIEF DESCRIPTION OF THE DRAWINGS

FIG. 13 is a flow chart of an operation of a method of controlling information on data links according to another embodiment of the present invention.

DETAILED DESCRIPTION OF THE PREFERRED EMBODIMENTS

The description will be directed to a method of controlling information on data links according to an embodiment of the present invention.

Figure 1:
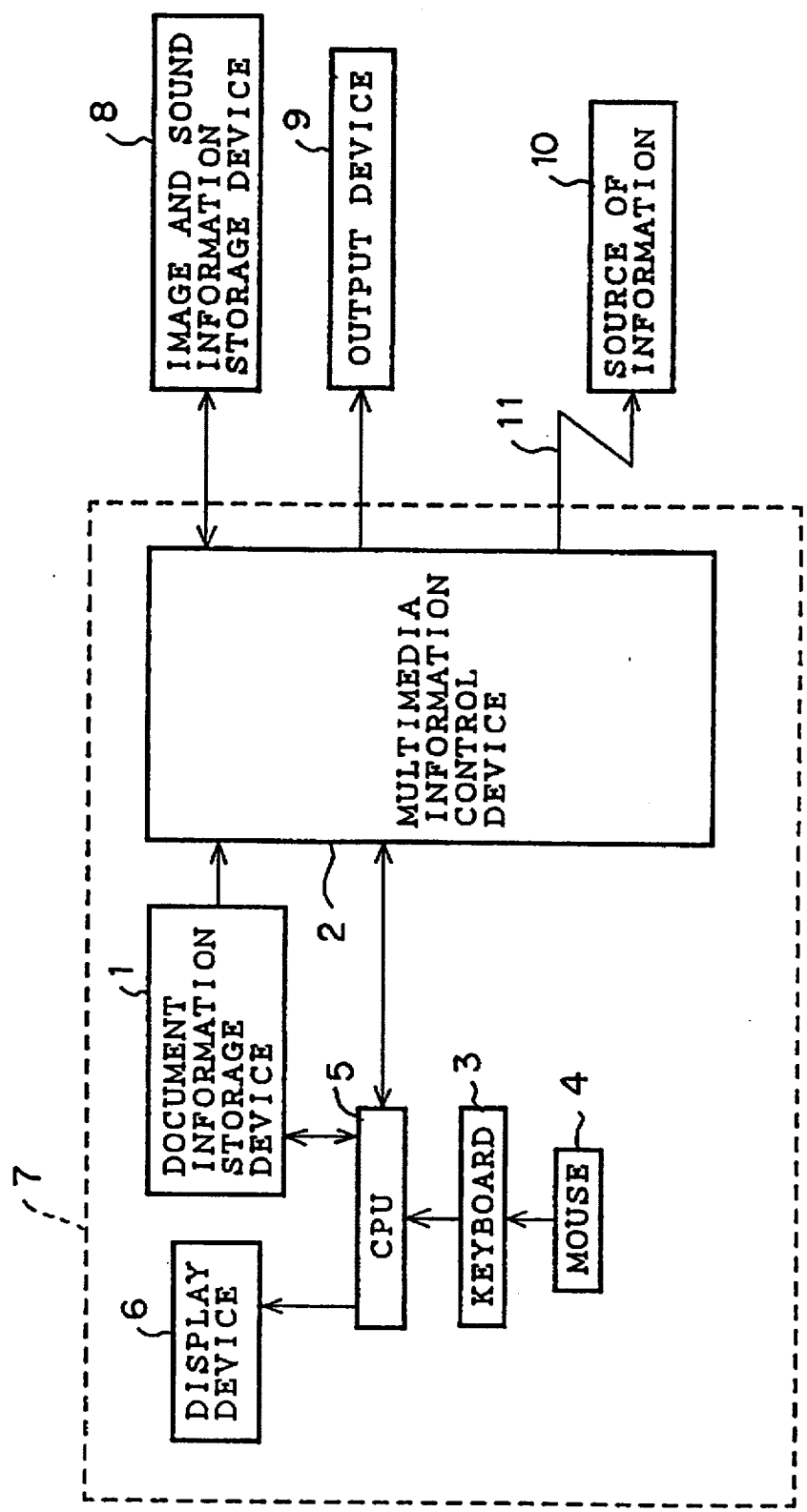
FIG. 1 is a block diagram of a prior art data retrieving apparatus.
Figure 2:
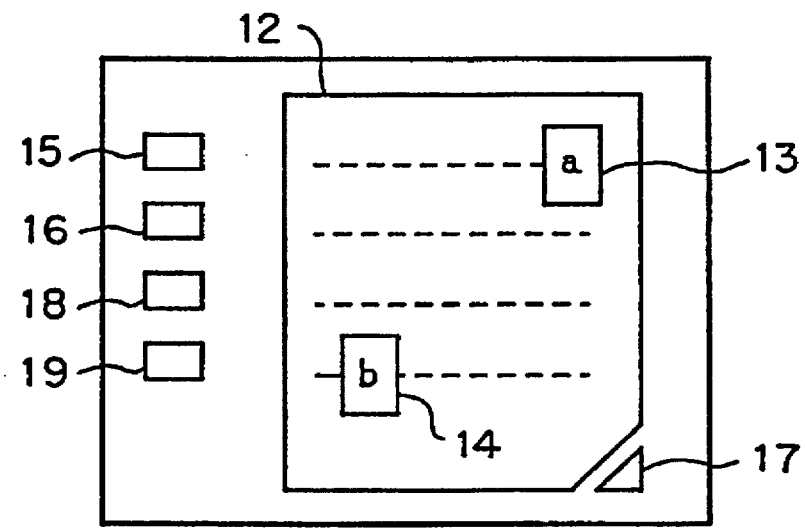
FIG. 2 is a view of a display screen of a data in the prior art data retrieving apparatus of FIG. 1.
Figure 3:
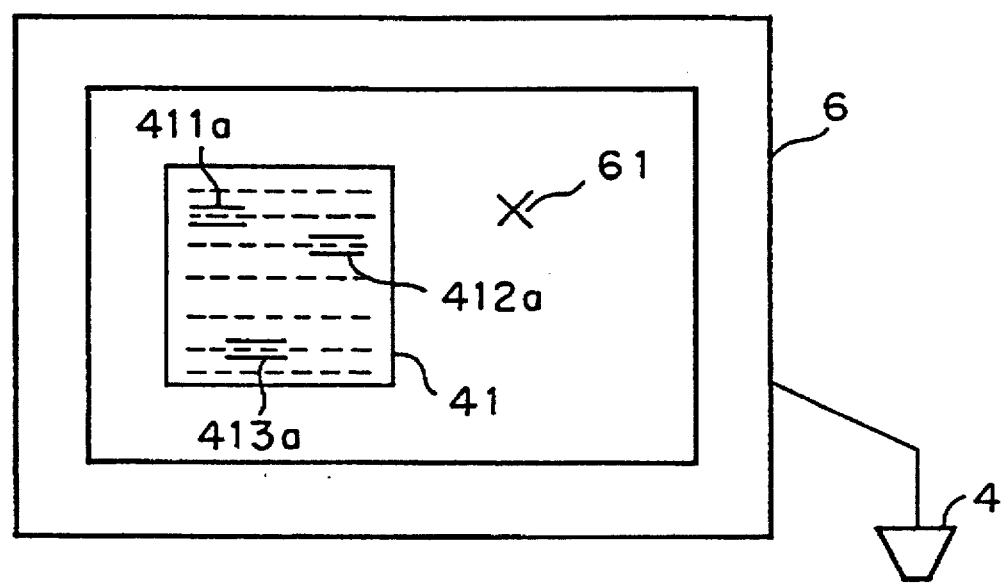
FIG. 3 is a view of an example of media data in the prior art data retrieving apparatus of FIG. 1.
Figure 4:
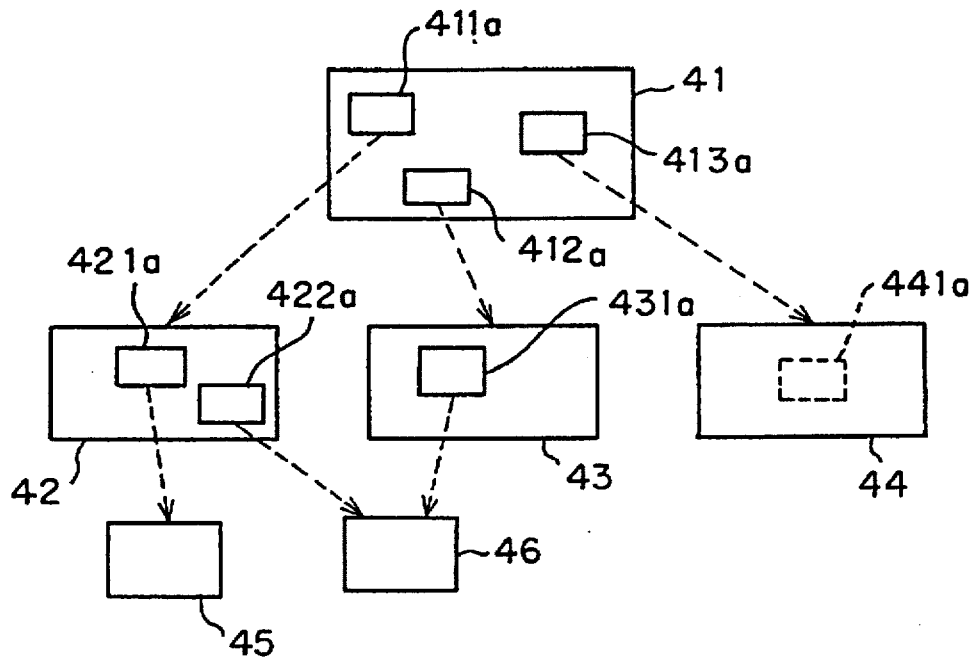
FIG. 4 is a view of the data structure in the prior art data retrieving apparatus of FIG. 1.
Figure 5:
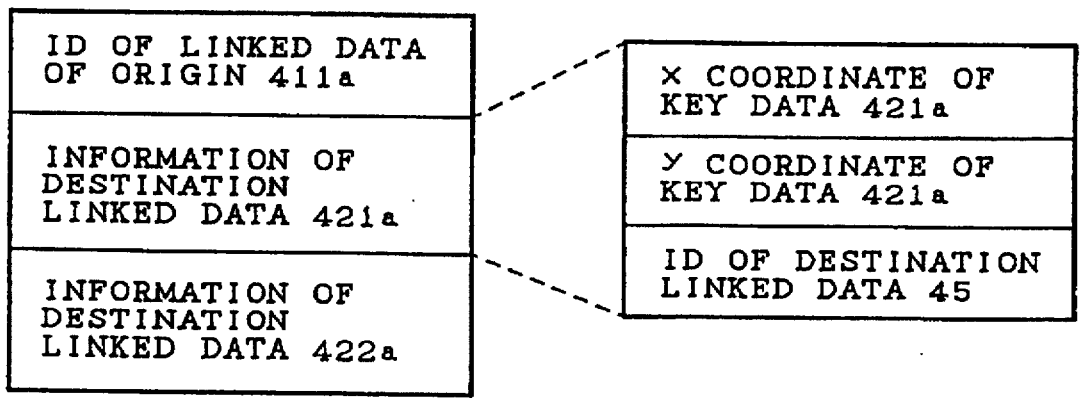
FIG. 5 is a view of link information of data in the prior art data retrieving apparatus of FIG. 1.
Figure 6:
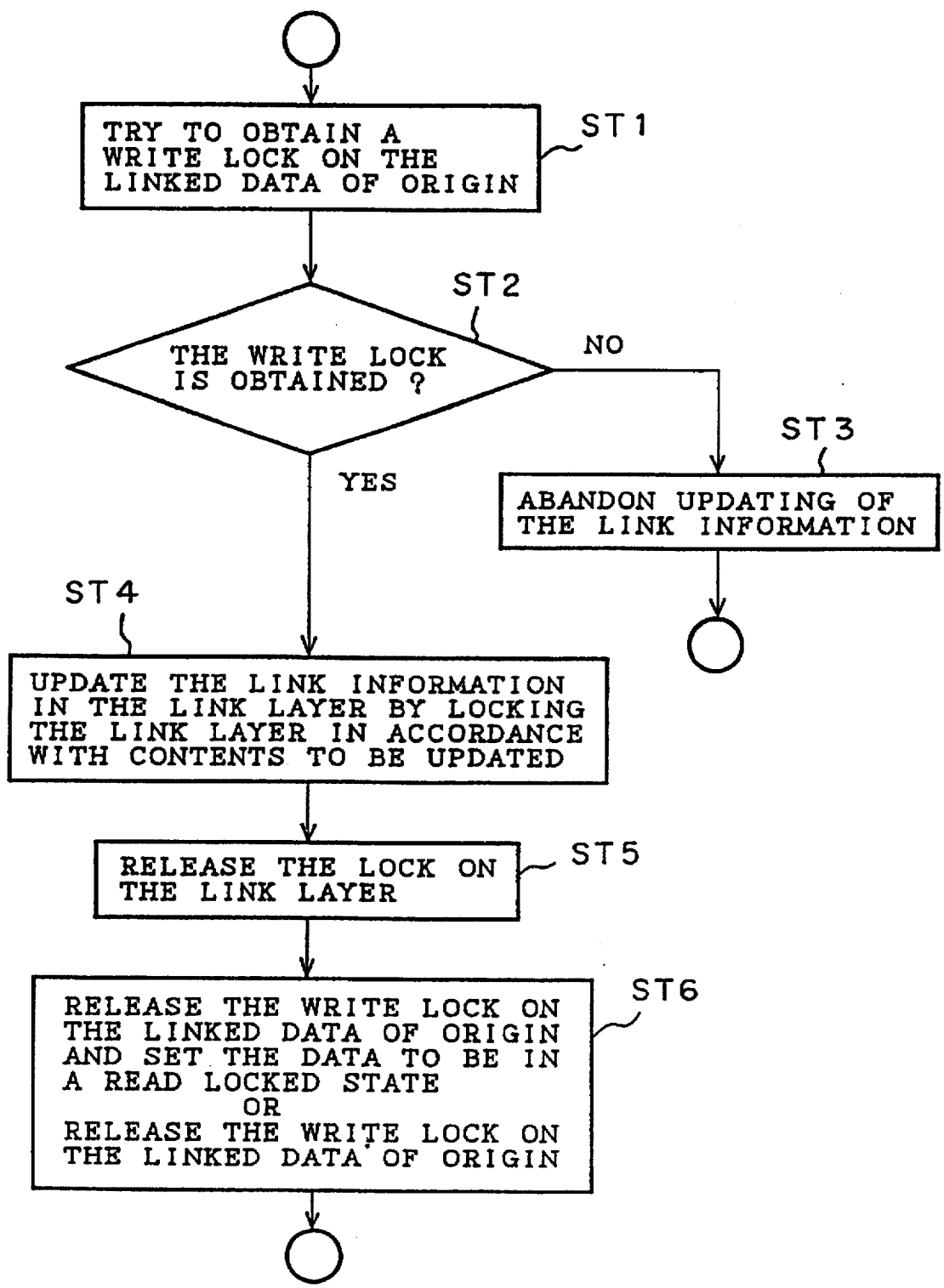
FIG. 6 is a flow chart of an operation of a method of controlling information on data links according to an embodiment of the present invention.
Figure 7:
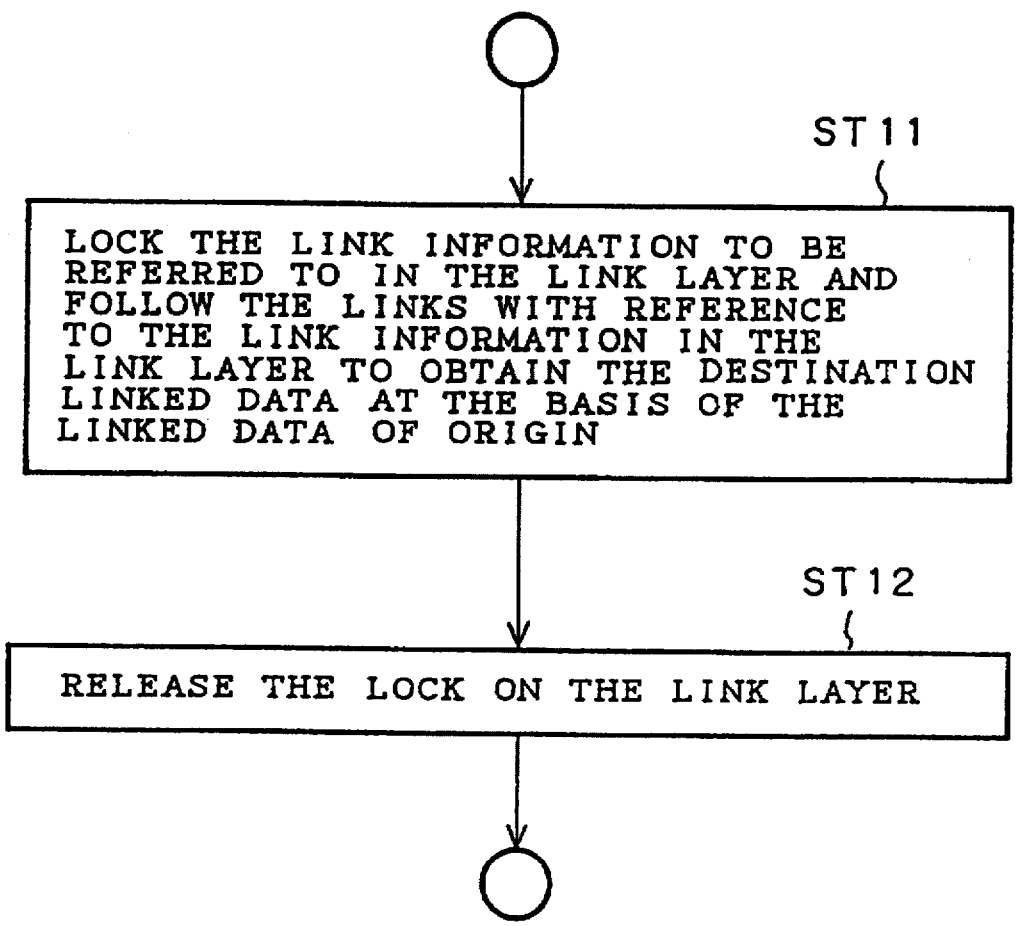
FIG. 7 is a flow chart of an operation of a method of controlling information on data links according to an embodiment of the present invention.
Figure 8:
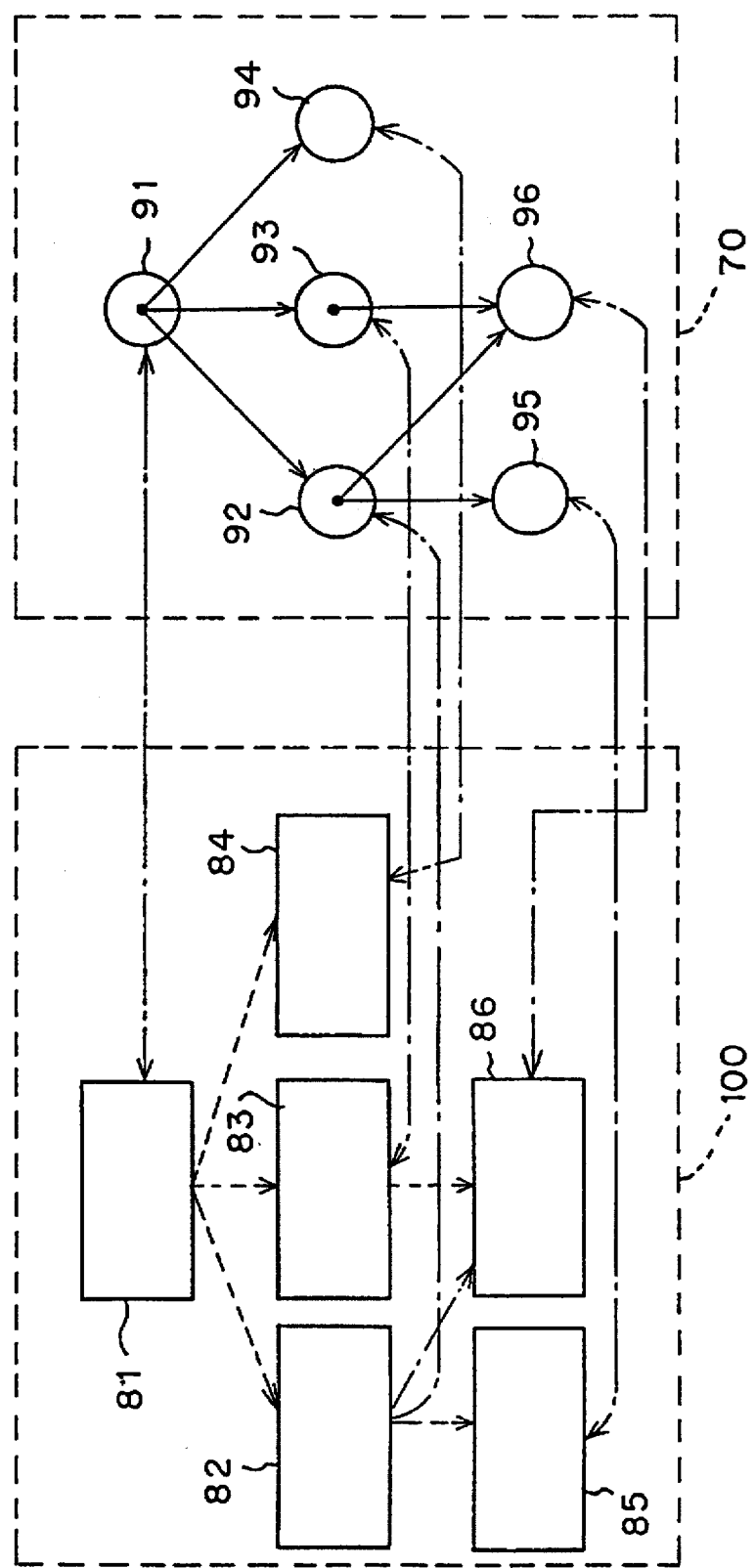
FIG. 8 is a view of the data structure according to an embodiment of the present invention.

FIGS. 6 and 7 are flow charts showing operations of the method of controlling information on data links according to this embodiment. FIG. 8 shows an example of the data structure concerned with this embodiment. In FIG. 8, shown are data 81 to 86 such as media data, numeral data, character data or a series of bits, etc., and nodes 91 to 96. The node 91 is interconnected with the nodes 92, 93 and 94 by bi-directional links; the node 92 is interconnected with the nodes 95 and 96 by bi-directional links; and the node 93 is interconnected with the node 96 by a bi-directional link. A link layer 70 consists of the nodes 91 to 96 and a data layer 100 consists of the data 81 to 86. Information on the data layer 100 and link layer 70 may be stored in a database in which concurrency control is performed for a plurality of users by means of write and read locks.

In FIG. 8, the data 81 to 86 in the data layer 100 correspond to the nodes 91 to 96 in the link layer 70, respectively. That is, there exist nodes in the link layer 70, which correspond to data linked to each other in the data layer 100, and the nodes are connected to each other by a bi-directional link.

Next, the description will be directed to an example of an operation of the method in the case of updating link information with reference to FIG. 6. In this example, the links which extend from the data 82 to the data 85 and 86 will be deleted. The data 82 is a linked data of origin. The data 85 and 86 are destination linked data. A linked data of origin is referred to as a data from which the corresponding link is extended to another data which is a destination linked data. A destination linked data is referred to as a data to which the corresponding link is extended from another data which is a linked data of origin. When a user selects the data 82 and requests a process for deleting a link extended from the data 82 to another data, acquisition of write lock is attempted on the data 82 which is a linked data of origin in step ST1 of FIG. 6. If some other user is referring to the data 82 at that time, the other user already holds a read lock on the data 82 and therefore the former user cannot obtain a write lock on the data 82. Thus, the acquisition of write lock results in a failure in step ST2 and the updating process of link information, i.e. the process of deleting the links between the data 82 and the data 85 and 86 is abandoned in step ST3.

Read lock is referred to as inhibiting other users from modifying a data which is to be locked, but allowing other users to read the data. Write lock is referred to as inhibiting other users from reading and modifying a data which is to be locked. Accordingly, when a data is set to be in a write locked state, the data must be in a state which has not been read and write locked. When a data is set to be in a read locked state, the data must be in a state which has not been write locked. That is, a data in a read locked state can be read locked again by other users.

If the data 82 is not being referred to by other users, the acquisition of write lock results in success in step ST2. Then, in step ST4 a write locking operation is performed for the nodes 92, 95 and 96 which correspond to the data 82, 85 and 86, respectively. The bi-directional links between the nodes 92 and 95 and between the nodes 92 and 96 are deleted. Next, the write locks on the nodes 92, 95 and 96 are released. Thus, the link layer is free from any locks. In step ST6, the data 82, which is the linked data of origin from which the corresponding links are extended to the data 85 and 86, is released from the write locked state and then is set to be in a read locked state in order to allow the user to continue to refer to the linked data of origin. If the user finishes referring to the linked data of origin, the read lock on the data 82 is freed. Steps ST5 and ST6 can be performed in the reverse order.

Thus, when link information is updated by a user, the link information in the link layer 70 is locked only in the case that the link information is changed actually, and then the information on data links is updated while other users are inhibited from reading and updating the information on data links. After that, the lock on the link information is released. Therefore, there are many chances that other users can read and update link information.

Unlike the above case, in which information on data links is updated, the data 82 in the data layer 100 is read locked but the link layer 70 is not locked in the case of merely referring to the data 82. Therefore, the data 82 in the data layer 100 is in a state that other users are allowed to read it, but are inhibited from updating the data 82 while it is being referred to. On the other hand, other users can read and modify the information on data links in the link layer 70 which corresponds to the data and therefore other users can establish a bi-directional link between the data 81 and the data 82 if the data 81, which is a linked data of origin from which the link is extended to the data 82, is not read locked. Like the above case, in which information on data links is updated, a bi-directional link is established in accordance with the flow chart shown in FIG. 6.

Next, the description will be directed to an example of an operation of this embodiment in the case of referring to link information with reference to FIG. 7. In this example, a user can obtain the data 85 and 86 which are destination linked data at the basis of the data 82 which is a linked data of origin from which the corresponding links are extended to the data 85 and 86 in FIG. 8. When the user selects the data 82, the node 92 which corresponds to the data 82 is read locked in step ST11. Furthermore, the user obtains the nodes 95 and 96, to which the corresponding links are extended from the node 92, with reference to the information on data links, and the user obtains the destination linked data 85 and 86 while the nodes 95 and 96 are read locked. In step ST12, the locks on the nodes 92, 95 and 96 are freed. Thus, all the locks that the user has obtained are released from the link layer 70. After that, as occasion demands the user sets the data 85 and 86 to be in a read lock state and refers to these data.

As mentioned above, according to the method of controlling information on data links according to this embodiment the data layer 100 composed of a plurality of data and link layer 70 for holding link information which represents link relationships among the plurality of data are disposed separately, and therefore data in the data layer 100 and link information in the link layer 70 can be read locked and write locked independently. Furthermore, when information on data links is not being referred to, or when information on data links is not being updated, a data is set to be in a read locked state if the data in the data layer 100 is referred to by a user, but the link information in the link layer 70 is not locked. Therefore, a new link can be established for the data which is being referred to and the piece of link information which has been created for the data can be updated or deleted. In addition, since other users cannot obtain a write lock on the data which is being referred to, the data is prevented from being changed by other users.

As explained above, in this embodiment a user updates or creates a data but, alternatively, performing a task can update or create a data.

Next, the description will be directed to a method of controlling information on data links according to another embodiment of the present invention. According to this embodiment, a key data which is a kind of data belongs to a media data which constitutes the data layer. This is a kind of hypermedia system in which a link is established from a media data to another media data by way of a key data which belongs to the former media data.

Figure 9:
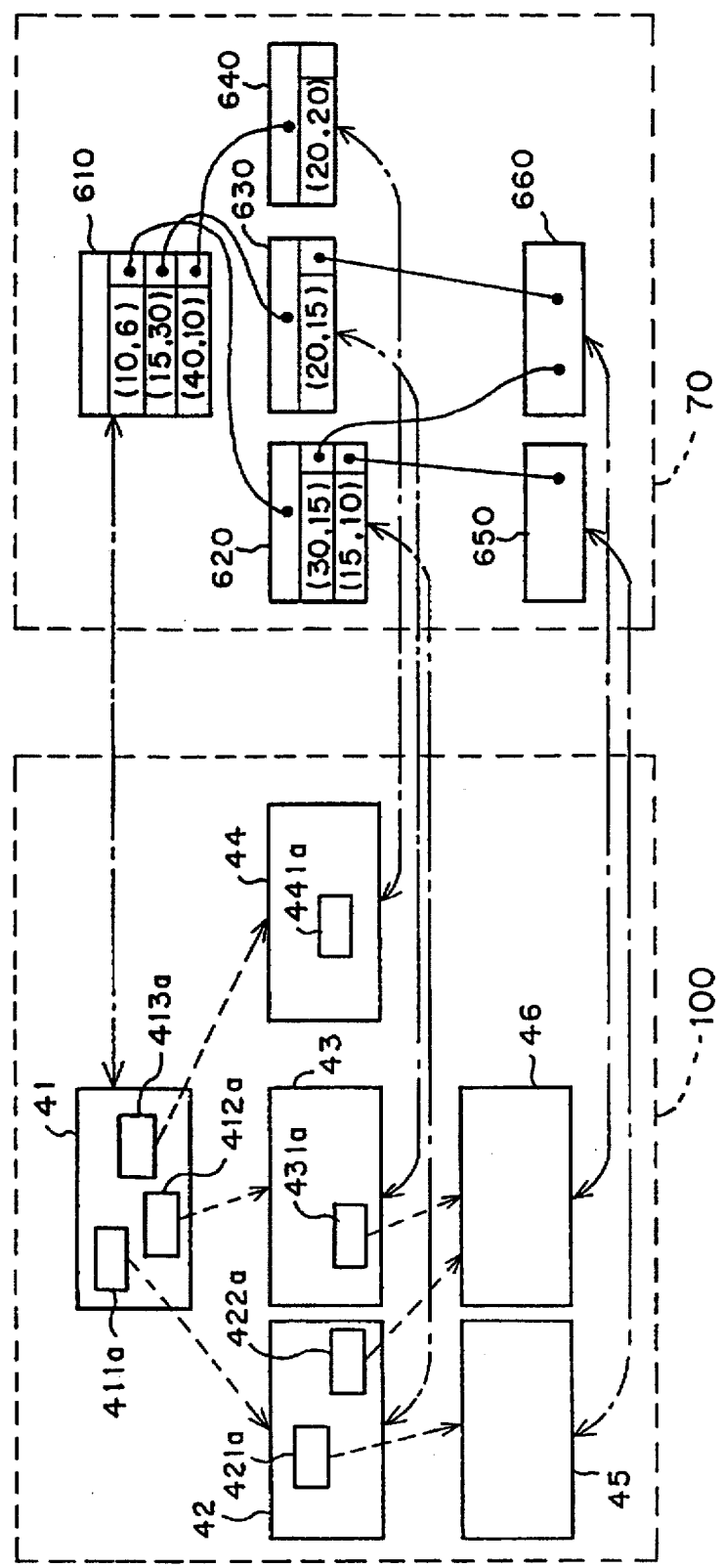
FIG. 9 is a view of the data structure associated with a method of controlling information on data links according to another embodiment of the present invention.

FIG. 9 shows an example of the data structure concerned with the method of controlling information on data links according to this embodiment. Like the first embodiment mentioned above, operations of the method of controlling information on data links according to this embodiment are performed in accordance with the flow charts shown in FIGS. 6 and 7.

In FIG. 9, the node 610 in the link layer 70 corresponds to the media data 41 in the data layer 100 and holds x and y coordinates of the centers of the key data 411a, 412a and 413a shown on the media data 41 and pointers directed to the destination link nodes to which the corresponding links are established by way of these key data, respectively. The node 620 corresponds to the media data 42 in the data layer 100 and holds a pointer directed to the linked node of origin 610, x and y coordinates of the centers of the key data 421a and 422a shown on the media data 42 and pointers directed to the destination linked nodes to which the corresponding links are established by way of these key data, respectively. The node 630 corresponds to the media data 43 in the data layer 100 and holds a pointer directed to the linked node of origin 610, x and y coordinates of the center of the key data 431a shown on the media data 43 and a pointer directed to the destination linked node to which the corresponding link is established by way of the key data.

Furthermore, the node 640 corresponds to the media data 44 and holds a pointer directed to the linked node of origin 610 and x and y coordinates of the center of the key data 441a shown on the media data 44. The node 650 corresponds to the media data 45 and holds a pointer directed to the linked node of origin 620. The node 660 corresponds to the media data 46 and holds pointers directed to the linked nodes of origin 620 and 630. Thus, the link layer 70 consists of the nodes 610, 620, 630, 640, 650 and 660 and the data layer 100 consists of the data 41 to 46 which correspond to the nodes, respectively. Information on the data layer 100 and link layer 70 may be stored in a database wherein concurrency control can be performed for a plurality of users by means of write and read locks.

Next, the description will be directed to an example of an operation of the method in the case of updating link information with reference to FIG. 6. In this example, the link which extends from the media data 42 to the media data 46 via the key data 422a shown in FIG. 9 will be deleted. The data 42 is a linked data of origin. The data 46 is a destination linked data. When a user selects the key data 422a shown in the media data 42 on the display and requests a process for deleting the link extended from the data 42 to the data 46, acquisition of write lock is attempted on the media data 42 which is a linked data of origin in step ST1 of FIG. 6. If some other user is referring to the data 42 at that time, the other user already holds a read lock on the data 42 and therefore the user cannot obtain a write lock on the data. Thus, the acquisition of write lock results in a failure in step ST2 and the updating process of link information, i.e. the process of deleting the links between the media data 42 and the media data 46 is abandoned in step ST3.

If the data 42 is not being referred to by other users, the acquisition of write lock results in success in step ST2. Then, in step ST4 a write locking operation is performed for the nodes 620 and 660 in the link layer, resulting in inhibiting other users from referring to these nodes. Next, the coordinates (30, 15) of the key data 422a which the node 620 holds and pointer which is directed to the destination linked node to which a link is established by way of the key data 422a are deleted. Furthermore, the pointer, which is directed to the linked node of origin 620 and the node 660 holds, is deleted. Finally, the change of link information is committed to last long. In step ST5, the locks on the nodes 620 and 650 in the link layer are released. Thus, the link layer is free from any locks. In step ST6, the data 42, which is the linked data of origin from which the corresponding links are extended to the data 45, is released from the write locked state and then is set to be in a read locked state in order to allow the user to continue to refer to the linked data of origin. If the user finishes referring to the linked data of origin, the read lock on the data 42 is freed. Steps ST5 and ST6 can be performed in the reverse order.

Thus, when link information is updated by a user, the link information in the link layer 70 are locked only in the case that the link information is changed actually, and then the information on data links is updated while the link information is read and write inhibited for other users. After that, the locks on the link information is released. Therefore, there are many chances that other users can read and update the link information.

Unlike the above case, in which information on data links is updated, the media data 42 in the data layer 100 is read locked but the link layer 70 is not locked in the case of merely referring to the media data 42. Therefore, the media data 42 in the data layer 100 is in a state wherein other users are allowed to read it, but are inhibited from modifying the media data 42 while it is being referred to. Information on data links in the link layer 70, e.g. pieces of information on the nodes 620 and 650 can be read and updated by other users, and therefore other users can establish a bi-directional link extended between the media data 41 and the media data 42 if the media data 41, which is a linked data of origin from which the corresponding link is extended to the media data 42, is not read locked. Like the above case, in which information on data links is updated, a bi-directional link is established in accordance with the flow chart shown in FIG. 6.

Next, the description will be directed to an example of an operation of this embodiment in the case of referring to link information, with reference to FIG. 7. In this example, a user can obtain the media data 46, which is a destination linked data, at the basis of the data 42, which is a linked data of origin, by way of the key data 422a, as shown in FIG. 9. When the user clicks the mouse while the key data 422a is indicated on the display device, the node 620 which corresponds to the media data 42 is obtained and then read locked in step ST11. Furthermore, the user obtains the node 660, to which the corresponding link is extended from the key data 422a, and the user obtains the destination linked data 46 while the node 660 is read locked. In step ST12, the locks of the nodes 620 and 660 are freed. Thus, all the locks that the user obtains are released from the link layer 70. After that, as occasion demands the user sets the media data 46 to be in a read lock state and refers to the media data.

As mentioned above, according to the method of controlling information on data links of the second embodiment the data layer 100 composed of a plurality of data and link layer 70 for holding link information which represents link relationships among the plurality of data are disposed separately, and therefore data in the data layer 100 and link information in the link layer 70 can be read locked and write locked independently. Furthermore, when information on data links is not being referred to, or when information on data links is not being updated, a data is set to be in a read locked state if the data in the data layer 100 is referred to by a user, but the link information in the link layer 70 is not locked. Therefore, a new link can be established for the data which is being referred to and the piece of link information which has been created for the data can be updated or deleted. In addition, since other users cannot obtain a write lock on the data which is being referred to, the data is prevented from being changed by other users.

As explained above, in this embodiment a user updates or creates a data but, alternatively, performing a task can update or create a data.

It is to be understood that data in the data layer 100 and link information in the link layer 70 are not limited to the example shown in FIG. 9.

Next, the description will be directed to a method of controlling information on data links according to another embodiment of the present invention. According to this embodiment, a key data which is a kind of data belongs to a media data which constitutes the data layer. This is a kind of hypermedia system in which a link is established from a media data to another media data by way of a key data which belongs to the former data.

Figure 10:
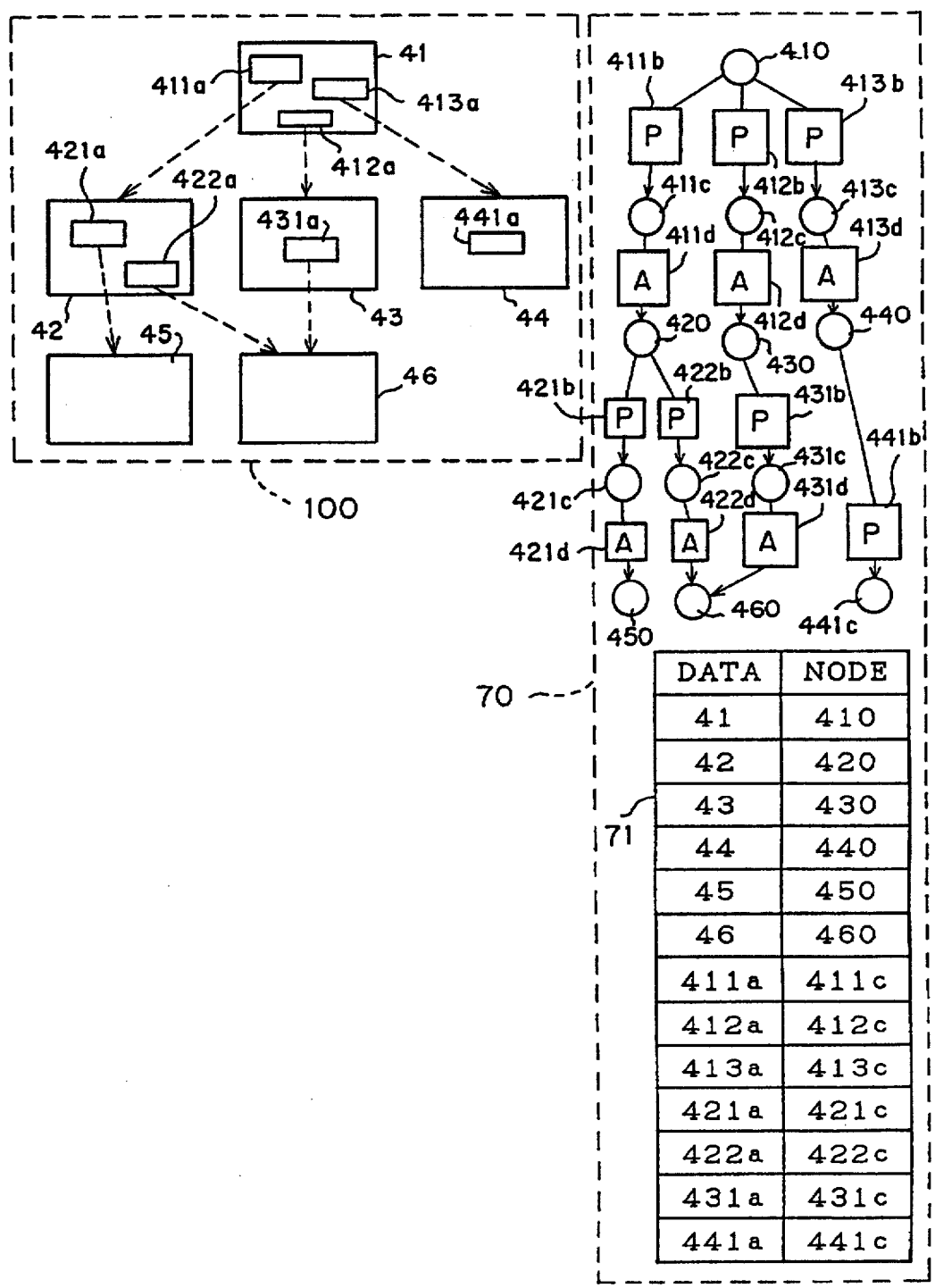
FIG. 10 is a view of the data structure associated with a method of controlling information on data links according to another embodiment of the present invention.

FIG. 10 shows an example of the data structure concerned with the method of controlling information on data links according to this embodiment. Like the first embodiment mentioned above, operations of the method of controlling information on data links according to this embodiment are performed in accordance with the flow charts shown in FIGS. 6 and 7.

In FIG. 10, shown are a node 410 which corresponds to a media data 41, a node 420 which corresponds to a media data 42, a node 430 which corresponds to a media data 43, a node 440 which corresponds to a media data 44, a node 450 which corresponds to a media data 45, and a node 460 which corresponds to a media data 46. Furthermore, a node 411c corresponds to a key data 411a, a node 412c corresponds to a key data 412a, a node 413c corresponds to a key data 413a, a node 421c corresponds to a key data 421a, a node 422c corresponds to a key data 422a, a node 431c corresponds to a key data 431a, and a node 441c corresponds to a key data 441a.

In addition, a reference numeral 411b denotes a bi-directional part link which connects the node 410 with the node 411c; 412b, a bi-directional part link which connects the node 410 with the node 412c; 413b, a bi-directional part link which connects the node 410 with the node 413c; 421b, a bi-directional part link which connects the node 420 with the node 421c; 422b, a bi-directional part link which connects the node 420 with the node 422c; 431b, a bi-directional part link which connects the node 430 with the node 431c; and 441b, a bi-directional part link which connects the node 440 with the node 441c.

Furthermore, a reference numeral 411d denotes a bi-directional association link which connects the node 411c with the node 420; 412d, a bi-directional association link which connects the node 412c with the node 430; 413d, a bi-directional association link which connects the node 413c with the node 440; 421d, a bi-directional association link which connects the node 421c with the node 450; 422d, a bi-directional association link which connects the node 422c with the node 460; 431d, a bi-directional association link which connects the node 431c with the node 460; 70, a link layer; and 71, a table showing correspondence between the plural media data in the data layer 100 and the nodes in the link layer 70. Each of the key data 411a, 412a, 413a, 421a, 422a, 431a and 441a holds information about a position where each key data is displayed in the background of the corresponding media data. Information on the data layer 100 and link layer 70 may be stored in a database wherein concurrency control can be performed for a plurality of users by means of write and read locks.

Next, the description will be directed to an example of an operation of the method in the case of updating link information, with reference to FIG. 6. In this example, the link which extends from the media data 42 to the media data 46 via the key data 422a shown in FIG. 10 will be deleted. The media data 42 is a linked data of origin. The media data 46 is a destination linked data. When a user selects the key data 422a shown in the media data 42 on the display and requests a process for deleting the link extended from the media data 42 to the media data 46, acquisition of write lock is attempted on the media data 42 which is a linked data of origin in step ST1 of FIG. 6. If some other user is referring to the media data 42 at that time, the other user already holds a read lock on the media data 42 and therefore the user cannot obtain a write lock on the media data. Thus, the acquisition of write lock results in a failure in step ST2 and the updating process of link information, i.e. the process of deleting the links between the media data 42 and the media data 46 is abandoned in step ST3.

If the media data 42 is not being referred to by other users, the acquisition of write lock results in success in step ST2. Then, in step ST4 the node 422c, which corresponds to the key data 422a, is obtained with reference to the correspondence table 71. Next, the part link 422b and association link 422d are obtained with reference to the bi-directional link 422c. Furthermore, the node 460 is obtained with reference to the bi-directional link of the association link 422d. Then, the node 420, part link 422b, node 422c, association link 422d, node 460 and correspondence table 71 are write locked. Furthermore, the bi-directional link between the node 420 and the part link 422b and bi-directional link between the association link 422d and the node 460 are disconnected, and the part link 422b, node 422c and association link 422d are deleted. Then, items which correspond to the nodes deleted are deleted from the correspondence table 71 and the key data 422a is deleted.

Finally, the change of link information is committed to last long. In step ST5, the locks on the nodes 420 and 460 in the link layer and correspondence table 71 are released. Thus, the link layer 70 is free from any locks. In step ST6, the media data 42, which is the linked data of origin from which the link is extended to the media data 46, is released from the write locked state and then is set to be in a read locked state in order to allow the user to continue to refer to the linked data of origin. If the user finishes referring to the linked data of origin, the read lock on the media data 42 is freed. Steps ST5 and ST6 can be performed in the reverse order.

Thus, when link information is updated by a user, the link information in the link layer 70 are locked only in the case that the link information is changed actually, and then the information on data links is updated while other users are inhibited from reading and updating the information on data links. After that, the lock on the link information is released. Therefore, there are many chances that other users can read and update link information.

Unlike the above case, in which information on data links is updated, the media data 42 in the data layer 100 is read locked but the link layer 70 is locked in the case of merely referring to the media data 42. Therefore, the media data 42 in the data layer 100 is in a state wherein other users are allowed to read it, but are inhibited from modifying the media data 42 while it is being referred to. Information on data links in the link layer 70, e.g. pieces of information on the nodes 420 and 460 can be read and updated by other users and therefore other users can establish a bi-directional link extended from the media data 41 to the media data 42 if the media data 41, which is a linked data of origin from which the link is extended to the media data 42, is not read locked. Like the above case, in which information on data links is updated, a bi-directional link is established in accordance with the flow chart shown in FIG. 6.

Next, the description will be directed to an example of an operation of this embodiment in the case of referring to link information, with reference to FIG. 7. In this example, a user can obtain the media data 46 which is a destination linked data at the basis of the data 42 which is a linked data of origin by way of the key data 422a, as shown in FIG. 10. When the user clicks the mouse while the key data 422a is indicated on the display device, the node 422c which corresponds to the key data 422a is read locked with reference to the correspondence table 71 in step ST11. Furthermore, the association link 422d and node 460 are read locked in turn while the bi-directional links are followed in turn. The media data 46, which corresponds to the node 460, is obtained with reference to the correspondence table 71. In step ST12, the locks on the node 422c, association link 422d, node 460 and correspondence table 71 are freed. Thus, all the locks that the user obtains are released from the link layer 70. After that, as occasion demands the user sets the media data 46 to be in a read locked state and refers to the media data.

As mentioned above, according to the method of controlling information on data links of the third embodiment the data layer 100 composed of a plurality of data and link layer 70 for holding link information which represents link relationship among the plurality of data are disposed separately, and therefore data in the data layer 100 and link information in the link layer 70 can be read locked and write locked independently. Furthermore, when information on data links is not being referred to, or when information on data links is not being updated, a data is set to be in a read locked state if the data in the data layer 100 is referred to by a user, but the link information in the link layer 70 is not locked. Therefore, a new link can be established for the data which is being referred to and the piece of link information which has been created for the data can be updated or deleted. In addition, since other users cannot obtain a write lock on the data which is being referred to, the data is prevented from being changed by other users.

As explained above, in this embodiment a user updates or creates a data but, alternatively, performing a task can update or create a data.

It is to be understood that data in the data layer 100 and link information in the link layer 70 are not limited to the example shown in FIG. 10.

It is to be understood that only those items in corresponding table 71 which correspond to locked media data and nodes may be locked instead of locking the whole correspondence table 71.

Next, the description will be directed to a method of controlling information on data links according to another embodiment of the present invention. According to this embodiment, information on data links is controlled exclusively in a data structure in which a key data which is a kind of data belongs to a media data and another key data belongs to a key data.

Figure 11:
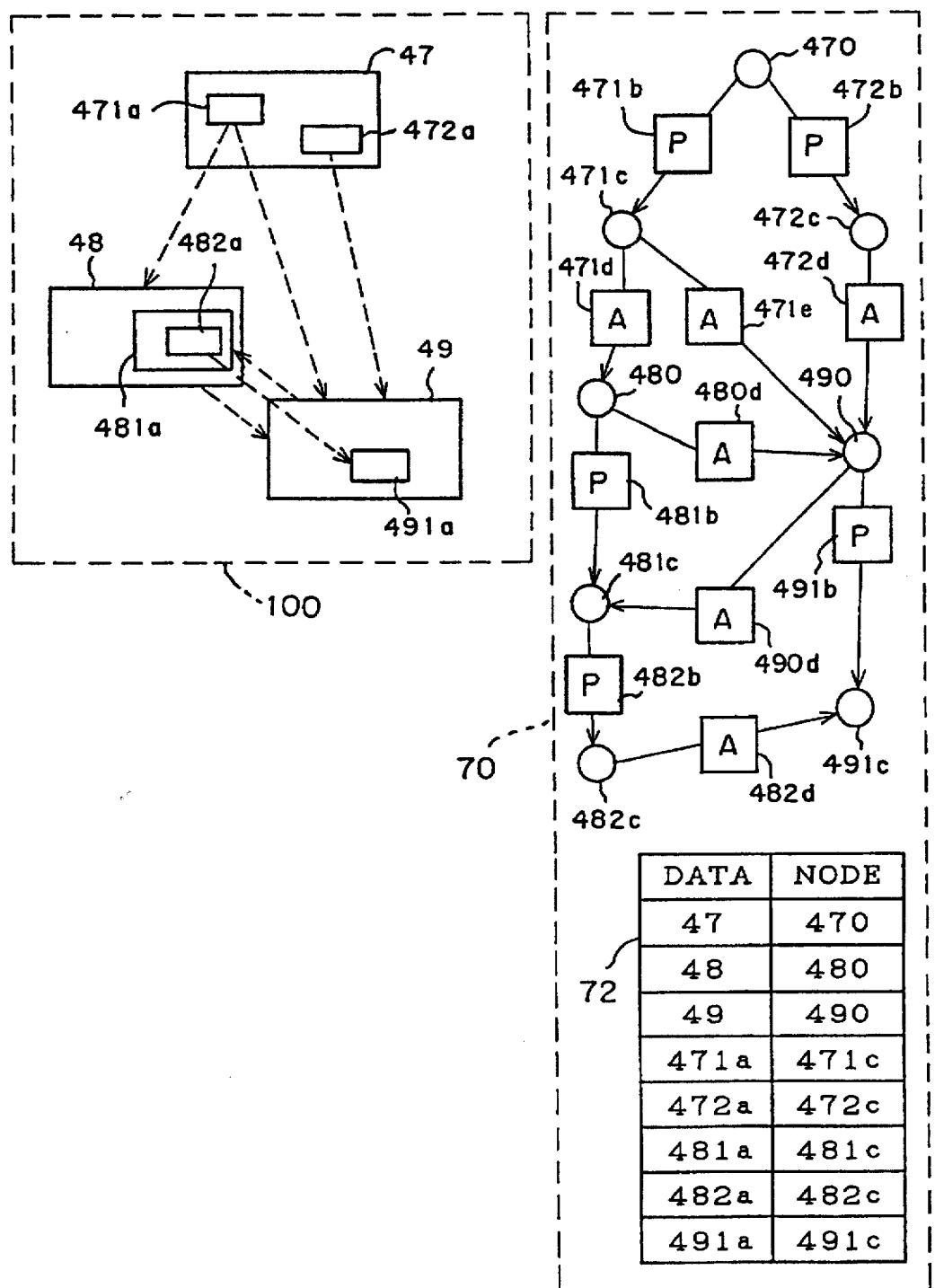
FIG. 11 is a view of the data structure associated with a method of controlling information on data links according to another embodiment of the present invention.

FIG. 11 shows an example of the data structure concerned with the method of controlling information on data links according to this embodiment. Like the first embodiment mentioned above, operations of the method of controlling information on data links according to this embodiment are performed in accordance with the flow charts shown in FIGS. 6 and 7.

In FIG. 11, shown are media data 47 to 49 in the data layer 100, key data 471a, 472a, 481a, 482a and 491a and nodes 470, 480 and 490 which correspond to the media data 47–49, respectively.

Reference numerals 471c, 472c, 481c, 482c and 491c denote nodes which correspond the key data 471a, 472a, 481a, 482a and 491a, respectively.

In addition, reference numerals 471b, 472b, 481b, 482b and 491b denote bi-directional part links and reference numerals 471d, 471e, 472d, 480d, 490d and 482d denote bi-directional association links. Furthermore, a reference numeral 100 denotes a data layer; 70, a link layer; and 72, a table showing correspondence between the plural media data in the data layer 100 and the nodes in the link layer 70.

As shown in FIG. 11, the key data 481a belongs to the media data 48 and further the other key data 482a belongs to the key data 481a. A link is extended from the key data 482a to the key data 491a. In such a case, it can be assumed that a link is established between the media data 48, which is a linked data of origin, and the data 491a, which is a destination linked data, by way of the key data 482a, and therefore the aforementioned method according to the second or third embodiment can be applied and the same advantage can be provided.

That is, the data layer 100 composed of a plurality of data and link layer 70 for holding link information which represents link relationships among the plurality of data are disposed separately, and hence data in the data layer 100 and link information in the link layer 70 can be read locked and write locked independently. Furthermore, when information on data links is not being referred to, or when information on data links is not being updated, a data is set to be in a read locked state if the data in the data layer 100 is referred to by a user, but the link information in the link layer 70 is not locked. Therefore, a new link can be established for the data which is being referred to and the piece of link information which has been created for the data can be updated or deleted. In addition, since other users cannot obtain a write lock on the data which is being referred to, the data is prevented from being changed by other users.

The same operations can be performed for a link established between two key data. For example, when a link is extended from the key data 482a to the key data 491a as shown in FIG. 11, it can be assumed that the linked data of origin is the media data 48, the destination linked data is the key data 491a and the link is established between the media data and the key data by way of the key data 482a.

The same operations can be performed for a link established between one key data and a plurality of data. For example, when a link is extended from the key data 471a to the media data 48 and 49 as shown in FIG. 11, it can be assumed that the linked data of origin is the media data 47, the destination linked data are the media data 48 and media data 49 and the links are established between the media data 47 and the media data 48 and 49 by way of the key data 471a. Like the second and third embodiments, the same operations offer the same advantage.

Next, the description will be directed to a method of controlling information on data links according to another embodiment of the present invention. Like the first embodiment mentioned above, operations of the method of controlling information on data links according to this embodiment are performed in accordance with FIGS. 6 and 7. Furthermore, the data structure according to this embodiment is the same as the data structure shown in FIG. 10.

The description will be directed to an example of an operation of the method in the case of updating link information, with reference to FIG. 6. In this example, the key data 441a and link which extends from the media data 44 to the key data 441a shown in FIG. 10 will be deleted. The media data 44 is a linked data of origin. The key data 441a is a destination linked data. When a user selects the key data 441a shown in the media data 44 on the display and requests a process for deleting the link extended from the media data 44 to the key data 441a, acquisition of write lock is attempted on the media data 44 which is a linked data of origin in the data layer 100 in step ST1 of FIG. 6. If some other user is referring to the data 44 at that time, the other user already holds a read lock on the data 44 and therefore the user cannot obtain a write lock on the data. Thus, the acquisition of write lock results in a failure in step ST2 and the updating process of link information, i.e. the process of deleting the links between the media data 44 and the key data 441a is abandoned in step ST3.

If the data 44 is not being referred to by other users, the acquisition of write lock results in success in step ST2. Then, in step ST4 the node 441c, which corresponds to the key data 441a, is obtained with reference to the correspondence table 71. Next, the part link 441b is obtained with reference to the bi-directional link 441c. Furthermore, the node 440 is obtained with reference to the bi-directional link of the part link 441b. Then, the node 440, part link 441b, node 441c and correspondence table 71 are write locked. Furthermore, the bi-directional link between the node 440 and the part link 441b is disconnected, and the part link 441b and node 441c are deleted. Then, the items which corresponds to the nodes deleted are deleted from the correspondence table 71 and the key data 441a is deleted.

Finally, the change of link information is committed to last long. In step ST5, the locks on the node 440 in the link layer 70 and correspondence table 71 are released. Thus, the link layer 70 is free from any locks. In step ST6, the media data 44, which is the linked data of origin in the data layer 100, is released from the write locked state and then is set to be in a read locked state in order to allow the user to continue to refer to the linked data of origin. If the user finishes referring to the linked data of origin, the read lock on the media data 44 is freed. Steps ST5 and ST6 can be performed in the reverse order.

Thus, when link information is updated by a user, the link information in the link layer 70 are locked only in the case that the link information is changed actually, and then the information on data links is updated while other users are inhibited from reading and updating the information on data links. After that, the lock on the link information is released. Therefore, there are many chances that other users can read and update link information.

Next, the description will be directed to an example of an operation of this embodiment in the case of referring to link information, with reference to FIG. 7. In this example, a user can obtain the key data 441a which is a destination linked data at the basis of the data 44 which is a linked data of origin. When the linked data of origin 44 is designated, the node 440 which corresponds to the data 44 is obtained with reference to the correspondence table 71 in step ST11. Furthermore, the node 440 in the link layer 70 are read locked while the corresponding bi-directional links are followed in turn. Furthermore, the part link 441b and node 441c are followed in turn while they are read locked, and then the data 441a, which corresponds to the node 441c, is obtained with reference to the correspondence table 71. In step ST12, the locks of the node 440, part link 441b, node 441c and correspondence table 71 are freed. Thus, all the locks that the user obtains are released from the link layer 70. After that, as occasion demands the user sets the key data 441a to be in a read locked state and refers to the media data.

It is to be understood that only those items in corresponding table 71 which correspond to locked media data and nodes may be locked instead of locking the whole correspondence table 71.

In the aforementioned embodiments, information on the data layer 100 and link layer 70 is adapted to be stored in a database wherein concurrency control can be performed for a plurality of users by means of write and read locks. Alternatively, each piece of information can be provided with its own lock state and its user who already holds a lock on each piece of information. By virtue of the added pieces of lock information, concurrency control functions for a plurality of users can be realized and hence the same advantages are provided.

Similarly, concurrency control functions for a plurality of users can be realized by means of recording a time when a referring or updating operation is performed for each data. Such a recording process offers the same advantage.

Furthermore, a referring or updating operation followed by retrieving link information in the reverse direction of links can provide the same advantages instead of referring to or updating link information while following the information in the normal direction of retrieving the link information from a linked data of origin to a destination linked data to which the corresponding link is extended from the linked data of origin. For example, in FIG. 10 it can be assumed that the media data 42 is a linked data of origin and the key data 411a is a destination linked data when following links from the media data 42 and then referring to the key data 411a. Also, updating operations of link information are performed in the same manner.

Like the above case, in which link information is referred to, a media data can be deleted. In this case, data in the data layer and link information in the link layer are locked at need. Links established between a media data to be deleted or a key data which belongs to the media data and other data are disconnected. Furthermore, the media data, key data which belongs to the media data and pieces of link information which corresponds to these data are deleted. After the deleting operation is completed, the locks on the link information are freed. Thus, the same advantages can be offered. In this case, the lock on the media data in the data layer is regarded as being released when the media data in the data layer is deleted.

Next, the description will be directed to another embodiment of the method of controlling information on data links, in which link information is updated or referred to while the link information is followed in the reverse direction of links.

Figure 12:
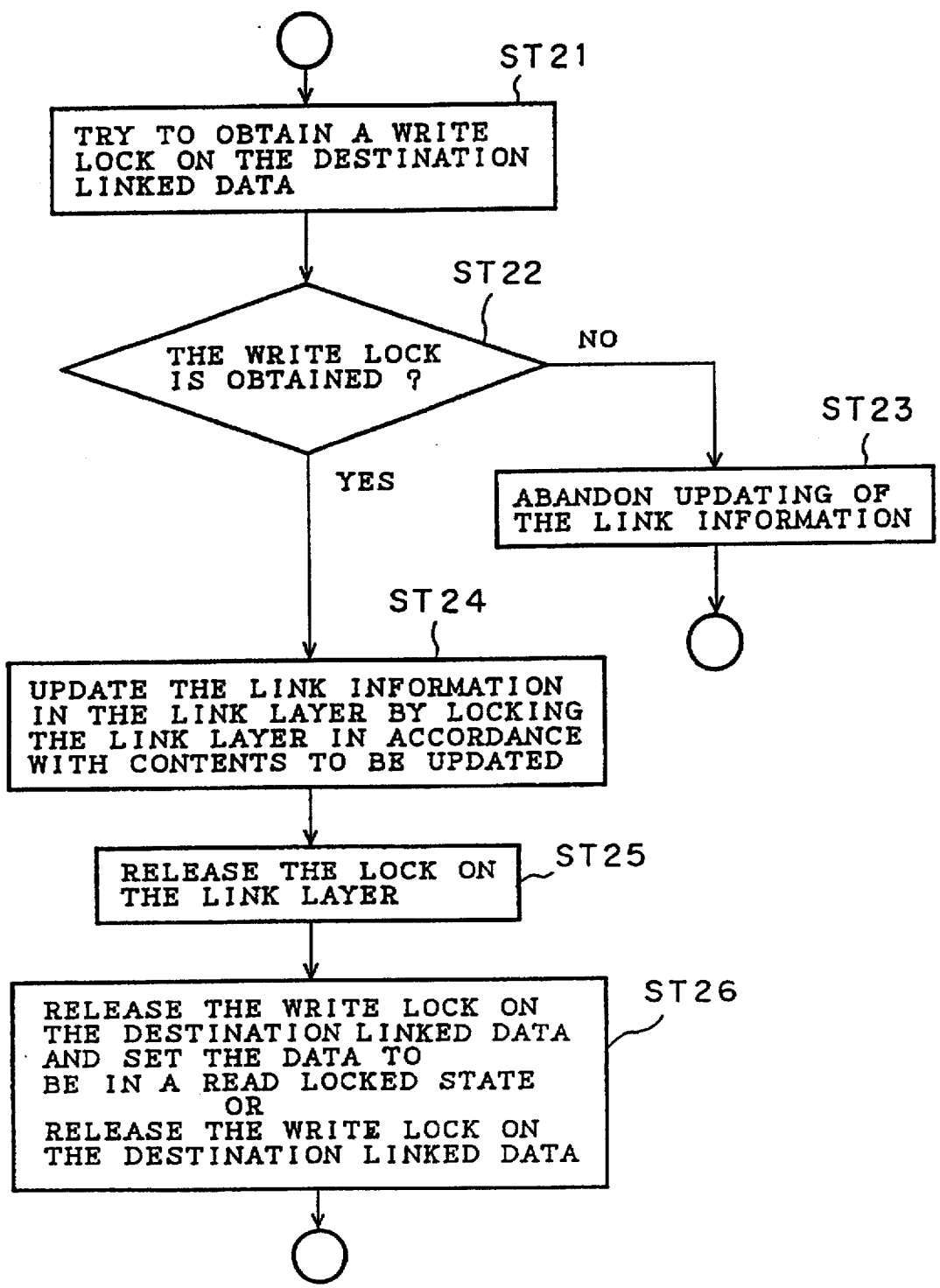
FIG. 12 is a flow chart of an operation of a method of controlling information on data links according to another embodiment of the present invention.

Referring now to FIG. 12, the flow chart shows an example of an operation of the method in the case of updating link information. In this example, the link which extends from the data 81 to the data 82 will be deleted in the data structure shown in FIG. 8. The data 81 is a linked data of origin. The data 82 is a destination linked data. When a user selects the data 82 and requests a process for deleting a link extended from the data 82 to another data, i.e. the data 81, acquisition of write lock is attempted on the data 82 which is a destination linked data in step ST21 of FIG. 12. If some other user is referring to the data 82 at that time, the other user already holds a read lock on the data 82 and therefore the user cannot obtain a write lock on the data. Thus, the acquisition of write lock results in a failure in step ST22 and the updating process of link information, i.e. the process of deleting the link between the data 81 and the data 82 is abandoned in step ST23.

If the data 82 is not being referred to by other users, the acquisition of write lock results in success in step ST22. Then, in step ST24 a write locking operation is performed for the nodes 91 and 92 which correspond to the data 81 and 82, respectively. The bi-directional link between the nodes 91 and 92 is disconnected. Next, the write locks on the nodes 91 and 92 are released in step ST25. Thus, the link layer is free from any locks. In step ST26, the data 82, which is the destination linked data, is released from the write locked state and then is set to be in a read locked state in order to allow the user to continue to refer to the destination linked data. If the user finishes referring to the destination linked data, the read lock on the data 82 is freed. Steps ST25 and ST26 can be performed in the reverse order.

Thus, when link information is locked by a user, the link information in the link layer 70 are locked only in the case that the link information is changed actually, and then the information on data links is updated while other users are inhibited from reading and updating the information on data links. After that, the lock on the link information is released. Therefore, there are many chances that other users can read and update link information.

Unlike the above case, in which information on data links is updated, the data 81 in the data layer 100 is read locked but the link layer 70 is not locked in the case of merely referring to the data 81. Therefore, the data 81 in the data layer 100 is in a state wherein other users are allowed to read it, but are inhibited from updating the data 81 while it is being referred to. On the other hand, the piece of information on data links in the link layer 70 which corresponds to the data can be read and updated by other users and therefore other users can establish a bi-directional link extended between the data 81 and the data 82 if the data 82, which is a destination linked data, is not read locked. Like the above case, in which information on data links is updated, a new bi-directional link is established in accordance with the flow chart shown in FIG. 12.

Next, the description will be directed to an example of an operation of this embodiment in the case of referring to link information with reference to FIG. 13. In this example, a user can obtain the data 81 which is a linked data of origin at the basis of the data 82 which is a destination linked data in FIG. 8. When the user selects the data 82, the node 92 which corresponds to the data 82 is read locked in step ST31. Furthermore, the user obtains the node 91, from which the corresponding link is extended to the node 92, with reference to information on data links, and the user obtains the linked data of origin 81 while the node 91 is read locked. In step ST32, the locks on the nodes 91 and 92 are freed. Thus, all the locks that the user obtains are released from the link layer 70. After that, as occasion demands the user sets the data 81 to be in a read locked state and refers to the data.

As mentioned above, according to the method of controlling information on data links of this embodiment the data layer 100 composed of a plurality of data and the link layer 70 for holding link information which represents link relationships among the plurality of data are disposed separately in the same manner as the first embodiment, and therefore data in the data layer 100 and information in the link layer 70 can be read locked and write locked independently. Furthermore, when information on data links is not being referred to, or when information on data links is not being updated, a data is set to be in a read locked state if the data in the data layer 100 is referred to by a user, but the link information in the link layer 70 is not locked. Therefore, a new link can be established for the data which is being referred to and the piece of link information which has been created for the data can be updated or deleted. Therefore, a new link can be established for the data which is being referred to and the piece of link information which has been established for the data can be updated or deleted. In addition, since other users cannot obtain a write lock on the data which is being referred to, the data is prevented from being changed by other users.

As mentioned above, the present invention offers many advantages as follows:

In a preferred embodiment, a data layer composed of a plurality of data and a link layer which holds link information about link relationships among the plurality of data are disposed. In the case that a user refers to a data in the data layer except when link information in the link layer is being referred to or updated, other users are inhibited from modifying the data and are allowed to read the data. Furthermore, other users are allowed to read and modify the link information in the link layer which corresponds to the data being referred to. Therefore, a new link can be established for a data which is being referred to and the link information can be changed or deleted.

Preferably, when a user refers to link information to obtain a destination linked data at the basis of a linked data of origin in the data layer, other users are inhibited from modifying the link information to be referred to but are allowed to read the link information. Finally, the user can obtain the destination linked data by following links from the linked data of origin with reference to the link information. After that, the lock on the link information is released. When a user updates link information, other users are inhibited from reading and modifying a linked data of origin, from which the corresponding link is extended, by locking the linked data of origin in the data layer. Furthermore, other users are inhibited from reading and modifying the link information by locking the link information in the link layer. Finally, the locks on the link information and on the linked data of origin are freed. Therefore, a new link can be established for a data which is being referred to and the link information can be changed or deleted. In addition, since other users cannot obtain a write lock on the data which is being referred to, the data is prevented from being changed by other users.

In a preferred embodiment, a key data which is a kind of data belongs to a data and a data can be linked with another data by way of a key data which belongs to the former data. In such a data structure, a data layer composed of a plurality of data and a link layer which holds link information about link relationships among the plurality of data are disposed. When a user refers to link information to obtain a destination linked data in the data layer, other users are inhibited from modifying the link information to be referred to but are allowed to read the link information by locking the link information. Finally, the user can obtain the destination linked data, to which the corresponding link is extended from a key data, by following links from the key data with reference to the link information. After that, the lock on the link information is released. When a user updates link information, other users are inhibited from reading and modifying a linked data of origin, from which the corresponding link is extended, by locking the linked data of origin in the data layer. Furthermore, other users are inhibited from reading and modifying the link information by locking the link information in the link layer. Finally, the locks on the link information and on the linked data of origin are freed. Therefore, a new link can be established for a data which is being referred to and the link information can be changed or deleted. In addition, since other users cannot obtain a write lock on the data which is being referred to, the data is prevented from being updated by other users.

While embodiments of this invention have been shown and described, it would be apparent to those skilled in the art that many more modifications than mentioned above are possible without departing from the spirit and scope of the present invention. It should be understood that the present invention is not limited to the specific embodiments described in the specification, except as defined in the appended claims.

What is claimed is:

1. A method of controlling information on data links, comprising the steps of:

creating a data layer composed of a plurality of data blocks;

creating a link layer which holds link information about link relationships among said plurality of data blocks in said data layer; and read locking a data block when a user refers to a data block in said data layer so that other users can read the data block and cannot modify the data block, and other users can read and modify the link information in said link layer which corresponds to the data block being referred to.

2. The method of controlling information on data links according to claim 1, further including the steps of:

write locking an origin data block and corresponding link information when a user updates the corresponding link information, so that other users can neither read nor modify the origin data block, from which the corresponding link is extended, and other users can neither read nor modify the corresponding link information; and write unlocking the corresponding link information and the origin data block after the link information is updated.

3. The method of controlling information on data links according to claim 2, further including the steps of:

read locking link information in said link layer when a user refers to the link information to obtain a destination data block based upon a corresponding origin data block from which the link is extended, so that other users can read the link information and cannot modify the link information; and read unlocking the link information after the destination data block is obtained.

4. The method of controlling information on data links according to claim 1, further including the steps of:

write locking a destination data block in said data layer when a user updates corresponding link information, so that other users can neither read nor modify the destination data block, to which the corresponding link information is extended, and write locking the corresponding link information in the link layer such that other users can neither read nor modify the corresponding link information in said link layer; and write unlocking the corresponding link information and the destination data block after the corresponding link information is updated.

5. The method of controlling information on data links according to claim 4, further including the steps of:

read locking link information in said link layer when a user refers to link information to obtain a corresponding origin data block based upon a corresponding destination data block to which the link information is extended, such that other users can read the link information and cannot modify the link information; and read unlocking the link information after the origin data block is obtained.

6. The method of controlling information on data links according to any one of claims 1 to 5, further comprising the steps of assigning key data to a first data block which is associated with a second data block, and linking the first data block with the second data block by way of the key data.

7. The method of controlling information on data links according to any one of claims 1 to 5, wherein one data block can contain a plurality of key data associated with the one data block, and wherein said data layer and said link layer are structured so that data blocks are linked with one another by way of the key data.

8. An apparatus for controlling information on data links, comprising:

a data layer composed of a plurality of data blocks;

a link layer which holds link information about link relationships among said plurality of data blocks in said data layer;

a data block read lock means which inhibits other users from modifying a data block and allows the other users to read the data block;

a data block write lock means which inhibits other users from modifying and reading a data block;

a link information read lock means which inhibits other users from modifying link information corresponding to an origin data block and its destination data block and allows the other users to read the link information corresponding to the origin data block and its destination data block; and a link information write lock means which inhibits other users from modifying and reading the link information corresponding to an origin data block and its destination data block.

9. The apparatus for controlling information on data links according to claim 8, wherein said link layer is constituted by a plurality of link nodes, each corresponding to a data block in said data layer, and wherein said link nodes each have a bidirectional link relationship with other link nodes in said link layer which corresponds to the link relationships between the data blocks in the data layer.

10. The apparatus for controlling information on data links according to claim 8, wherein said link layer is constituted by a plurality of link nodes and a plurality of key-link nodes, each link node corresponding to each data block in said data layer, and each key-link node corresponding to key data contained within a corresponding data block in said data layer; and wherein each key-link node corresponding to key data associated with an origin data block holds position information of the key data which it corresponds to; and wherein each key-link node also holds pointers which indicate destination linked nodes within the link layer corresponding to a destination data block which the key-link node's corresponding key data points to; and wherein link nodes, which have link relationships between the link nodes in said link layer, are connected to one another by bidirectional links by way of a key-link node.

11. The apparatus for controlling information on data links according to claim 8, wherein said link layer is constituted by a plurality of link nodes each corresponding to a data block in said data layer, wherein origin data blocks include key data associated with data in the origin data blocks, and wherein said link layer includes key-link nodes corresponding to the key data, and wherein link nodes in said link layer which have link relationships are connected to each other by a bidirectional link by way of the key-link node of a key data which belongs to an origin data block.

12. The apparatus for controlling information on data links according to claim 11, wherein when a data block is linked with a plurality of data blocks by way of a key data which belongs to said data block, the link node of said data block is connected with the link nodes of said plural data blocks by bidirectional links by way of the key-link node which corresponds to said key data.

13. The apparatus for controlling information on data links according to claim 12, wherein a link between two key data which belong to different data blocks is established by a bidirectional link between the key-link nodes which correspond to said two key data.

14. The apparatus for controlling information on data links according to any one of claims 8 to 13, wherein when a user updates link information, said data block write lock means inhibits other users from reading and modifying an origin data block, from which the corresponding link is extended, by write locking the origin data block in said data layer, and said link write lock means inhibits other users from reading and modifying the link information by locking the link information in said link layer, and wherein said link write lock means releases the lock on the link information and said data block read lock means releases the write lock on the origin data block.

15. The apparatus for controlling information on data links according to claim 14, wherein when a user refers to link information to obtain a destination data block, to which the corresponding link is extended, based upon the corresponding origin data block from which the link is extended, said link read lock means allows other users to read the referred link information and inhibits other users from modifying the link information by read locking the link information in said link layer, and wherein said link read lock means releases the lock on the link information after the destination data block is obtained.

16. The apparatus for controlling information on data links according to claim 15, wherein information on data blocks in said data layer and information on links in said link layer are stored in a database in which a concurrency control can be performed for a plurality of users.

17. The apparatus for controlling information on data links according to any one of claims 8 to 13, wherein when a user updates link information, said data write lock means inhibits other users from reading and modifying a destination data block, to which the corresponding link is extended, by write locking the destination data block in said data layer, and said link write lock means inhibits other users from reading and modifying the link information by write locking the link information in said link layer, and wherein said link write lock means releases the write lock on the link information and said data write lock means releases the write lock on the destination data block.

18. The apparatus for controlling information on data links according to claim 17, wherein when a user refers to link information to obtain an origin data block, from which the corresponding link is extended, based upon the corresponding destination data block to which the link is extended, said link read lock means allows other users to read the referred link information and inhibits other users from modifying the link information by read locking the link information in said link layer, and wherein said link read lock means releases the read lock on the link information after the origin data block is obtained.

19. The apparatus for controlling information on data links according to claim 18, wherein information on data blocks in said data layer and information on links in said link layer are stored in a database in which a concurrency control can be performed for a plurality of users.

* * * * *